United States Patent [19]
Westberg et al.

[11] Patent Number: 5,946,309
[45] Date of Patent: Aug. 31, 1999

[54] HYBRID ATM ADAPTATION LAYER

[75] Inventors: Lars Westberg, Enköping; Karl Anders Näsman, Solna; Lars-Göran Petersen, Tumba, all of Sweden

[73] Assignee: Telefonaktiebolaget LM Ericsson, Stockholm, Sweden

[21] Appl. No.: 08/701,146

[22] Filed: Aug. 21, 1996

[51] Int. Cl.$^6$ .................................................. H04L 12/66
[52] U.S. Cl. .......................... 370/395; 370/474; 370/537; 370/538
[58] Field of Search ..................... 370/395, 473, 370/474, 537, 538

[56] References Cited

U.S. PATENT DOCUMENTS

| 4,999,835 | 3/1991 | Lagoutte | 370/395 |
|---|---|---|---|
| 5,509,007 | 4/1996 | Takashima et al. | 370/391 |
| 5,528,591 | 6/1996 | Lauer | 370/321 |
| 5,577,039 | 11/1996 | Won et al. | 370/466 |
| 5,619,499 | 4/1997 | Nakabayashi | 370/469 |
| 5,638,365 | 6/1997 | Duault et al. | 370/469 |

OTHER PUBLICATIONS

Frimmel, "Inverse Multiplexing Tailor–Made for ATM", Telephony, Jul. 15, 1996, pp. 28–34.

"B–ISDN ATM Adaptation Layer (AAL) Type 5 Specification", ITU–T Recommendation I.363.5, (Geneva) 1996, pp. 115–125.

"B–ISDN ATM Layer Specification", ITU–T Recommendation I.361, 1995.

"Traffic Management Specification, Version 4.0", ATM Forum Technical Committee, af–tm–0056.000, Apr. 1996.

*Primary Examiner*—Chi H. Pham
*Assistant Examiner*—Frank Duong
*Attorney, Agent, or Firm*—Burns, Doane, Swecker & Mathis, L.L.P.

[57] ABSTRACT

In a telecommunication system that generates more than one type of communication data stream, in which each data stream exhibits a distinctive data transfer format, bandwidth utilization is improved by first reformatting the different data transfer formats so that all of the data is compatible with a common data transfer protocol, for example, the Asynchronous Transfer Mode (ATM) protocol. The communication data and the corresponding control data, required to maintain communication data alignment, are multiplexed into a single data stream which is then transmitted over a common telecommunication channel to a receiving station.

16 Claims, 18 Drawing Sheets

| PTI-Code | Congestion Status | SDU-Type |
|---|---|---|
| 0 | Un-congested | 0 |
| 1 | Un-congested | 1 |
| 2 | Congested | 0 |
| 3 | Congested | 1 |

FIG. 5
PRIOR ART

| PTI-Code | AAL-Layer | SDU-Type |
|---|---|---|
| 0 | AAL1 | 0 |
| 1 | AAL1 | 1 |
| 2 | AAL5 | 0 |
| 3 | AAL5 | 1 |

FIG. 6

HYBRID ATM ADAPTATION LAYER

BACKGROUND

The present invention relates to the transmission of telecommunication data using Asynchronous Transfer Mode (ATM) protocol and ATM adaptation layers (AAL). More specifically, the invention relates to the transfer of telecommunication data by multiplexing data from a variety of different AAL protocols over a single communication channel.

ATM is a standard protocol that may be applied for transmitting asynchronous telecommunication data within a telecommunication system that may service one or more applications (i.e., one or more sources of telecommunication data). The ATM protocol is based on the transmission of data in fixed size cells known as ATM cells. The protocol for each ATM cell is the same, wherein, each ATM cell contains a 48 octet payload and a 5 octet header. In general, ATM is well known in the art.

The telecommunication data associated with each application is initially in a data transfer format that is specific to that application. If ATM is to be used for transporting this data, the data transfer format must be adapted so that it is compatible with the ATM protocol. This is accomplished by an ATM adaptation layer (AAL) 101, as illustrated in FIG. 1. The application layer 102 represents telecommunication data arriving from a specific application. The AAL 101 then reformats the data so the data is compatible with the ATM protocol. Specifically, the AAL 101 stores the data in the payload of ATM cells. The ATM layer 103 then transmits the ATM cells containing the reformatted telecommunication data to a receiving station (not shown in FIG. 1). In general, each application requires a different AAL.

Two of the most commonly known AALs are designated AAL1 and AAL5. AAL1 is used for synchronous data transmission and AAL5 is used for packet data transmission. Another well known AAL has been designated AALm. AALm is typically employed to make ATM more efficient when ATM is used to support the transportation of low bit rate application data, such as cellular voice data. AALm operates by storing the low bit rate data in small data packets called microcells (also referred to as minicells). The microcells are then multiplexed into the payload of ATM cells.

When the telecommunication system is servicing more than one application at a time, e.g., voice and video, or the system is servicing one application that produces hybrid data (i.e., produces data exhibiting more than one data transfer format), more than one type of AAL will be required to reformat the data to make it compatible with the ATM protocol. Present systems transmit data from multiple AALs to a receiving station by dedicating separate ATM channels for each type of data. This becomes problematic especially when low bit rate applications are involved because ATM does not efficiently transmit low bit rate data (i.e., large portions of the ATM cells carrying low bit rate data go unused). Therefore, transporting low bit rate data over multiple ATM channels only compounds the inefficiency, and bandwidth tends to be very expensive.

SUMMARY

In order to maximize bandwidth utilization, the present invention avoids transmitting hybrid data over separate communication channels. Instead, the present invention provides a Hybrid AAL that transmits data from multiple AALs over a single communication channel.

It is an object of the present invention to provide the capability of transporting telecommunication data from multiple AALs using the ATM protocol.

It is yet another object of the present invention to provide the capability of transporting telecommunication data from multiple AALs over a common communication channel to maximize bandwidth utilization.

In accordance with one aspect of the present invention, the foregoing and other objects are achieved by a method of transmitting data packets to a receiving station, comprising the steps of: receiving hybrid data from at least one telecommunication application, wherein the hybrid data comprises a plurality of data transfer formats; inserting data having a first data transfer format into at least one data packet; inserting data having a second data transfer format into at least one data packet; multiplexing the data packets into a single data stream; and transmitting the data packets to the receiving station over a common telecommunication channel, wherein all data packets exhibit a common data transfer protocol.

In accordance with another aspect of the present invention, the foregoing and other objects are achieved by an apparatus for transmitting data packets to a receiving station comprises: means for receiving hybrid data from at least one telecommunication application, wherein the hybrid data comprises a plurality of data transfer formats; means for inserting data having a first data transfer format into at least one data packet; means for inserting data having a second data transfer format into at least one data packet; means for multiplexing the data packets into a single data stream; means for generating control data for the at least one data packet corresponding to the data having a first data transfer format; means for generating control data for the at least one data packet corresponding to the data having a second data transfer format; means for multiplexing the control data into the single data stream; and means for transmitting the data packets and the control data over a common telecommunication channel, wherein all data packets exhibit a common data transfer protocol.

In accordance with yet another aspect of the present invention, the foregoing and other objects are achieved by a system for transporting data packets to a receiving station comprises: a plurality of Asynchronous Transfer Mode adaptation layers (AALs), wherein each AAL receives communication data exhibiting a different data format and inserts the data into Asynchronous Transfer Mode cells; a hybrid AAL multiplexer for inserting the Asynchronous Transfer Mode cells into a single data stream; a transmitter; and a common communication channel, wherein said transmitter transmits the Asynchronous Transfer Mode cells to the receiving station over the common communication channel.

BRIEF DESCRIPTION OF THE DRAWINGS

The objects and advantages of the invention will be understood by reading the following detailed description in conjunction with the drawings in which:

FIG. 5 is a table indicating the purpose of the PTI code in a standard ATM cell header according to the prior art;

FIG. 6 is a table indicating how the present invention utilizes the PTI code in an otherwise standard ATM cell header;

DETAILED DESCRIPTION

The present invention will now be described with reference to the figures.

Figure 1:
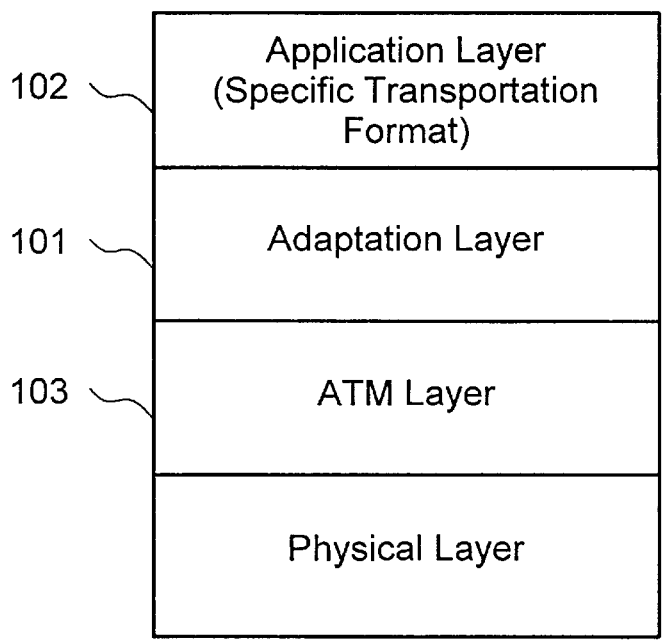
FIG. 1 is a functional block diagram of a known layered process for transporting telecommunication data using asynchronous transfer mode according to the prior art.
Figure 2:
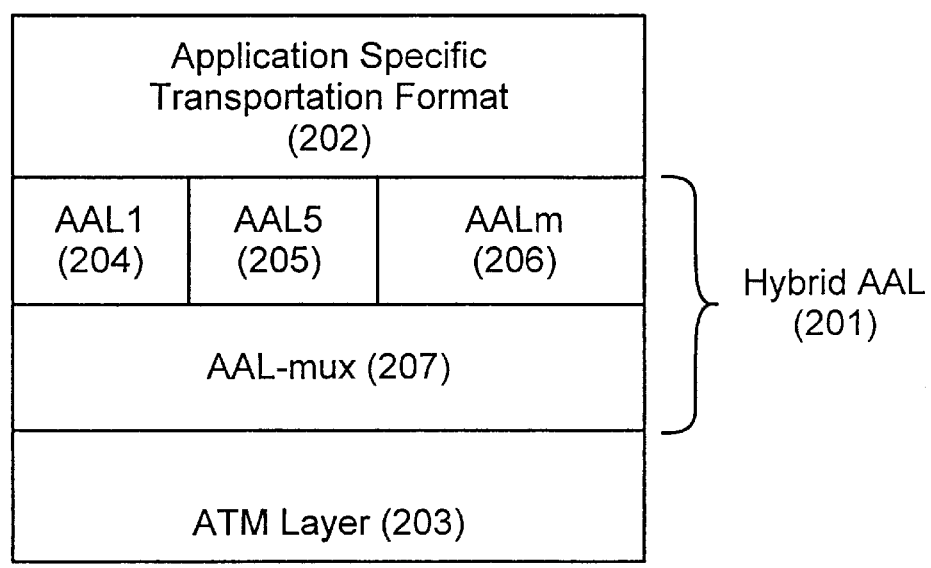
FIG. 2 is a functional block diagram of the Hybrid AAL of the present invention.

FIG. 2 illustrates the Hybrid AAL of the present invention. Like the AAL 101 depicted in FIG. 1, the Hybrid AAL 201 is functionally located between the Application layer 202 and the ATM layer 203. However, unlike the AAL 101 in FIG. 1, the Hybrid AAL 201 includes more than one standard AAL, for example, AAL1 204, AAL5 205, and AALm 206. The Hybrid AAL 201 also includes an AAL multiplexer (AAL-mux) 207. By employing the Hybrid AAL 201, bandwidth is more effectively utilized because hybrid data (i.e., communication data from different AALS) can now be transmitted over a single, commonly shared communication channel, rather than separate communication channels.

Figure 3:
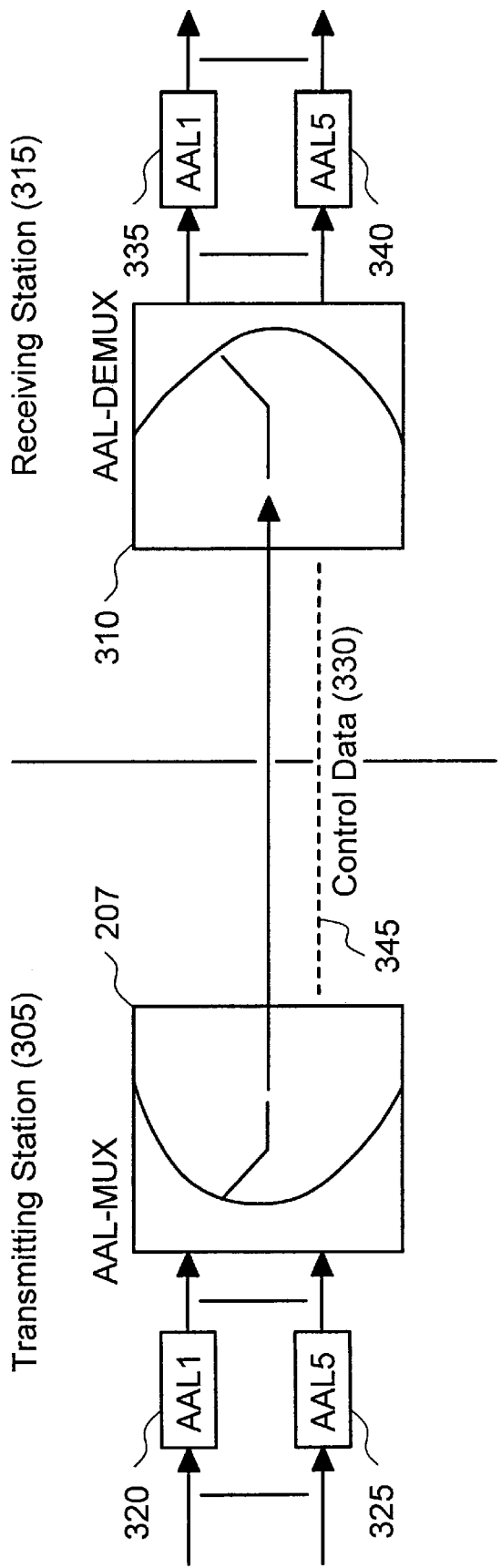
FIG. 3 is a diagram illustrating the AAL multiplexer at the transmitting station and the AAL demultiplexer at the receiving station.

FIG. 3 illustrates the basic functionality of an AAL-mux 207, located at a transmission station 305, and the basic functionality of an AAL-demux 310, located at the receiving station 315. The AAL-mux 207 receives communication data from each of the various AAL layers, for example, AAL1 320 and AAL5 325. The data has already been reformatted, as explained above, so that it is compatible with the ATM protocol. More specifically, the data has been packed into the payload of standard ATM cells. The AAL-mux 207 then multiplexes the data into one common ATM stream. The ATM layer 103 then attaches a header to each ATM cell payload generated by the AAL-mux 207 and transmits each ATM cell to the receiving station 315.

The AAL-mux 207 also generates control data 330, which is used to synchronize the AAL-mux 207 and the AAL-demux 310. The control data 330 permits the AAL-demux 310 to identify the source and destination of the communication data stored in each incoming ATM cell so that it can direct the communication data to the appropriate AAL layer in the receiving station 315, for example, AAL1 335 and AAL5 340. A more detailed description of the AAL-mux 207 and the AAL-demux 310 will be presented below.

Although the control data 330 is transmitted over the same physical communication channel as the hybrid communication data, the control data 330 may be inserted into different logical channels, as illustrated by dashed line 345. Though one skilled in the art will readily understand that other methods may be employed, four exemplary methods for transporting the control data 330 from a transmission station 305 to a receiving station 315 will now be described in greater detail hereinbelow.

A first exemplary method will now be described, in which control data 330 is transported from a transmission station 305 to a receiving station 315 in the header of an otherwise standard ATM cell.

Figure 4:
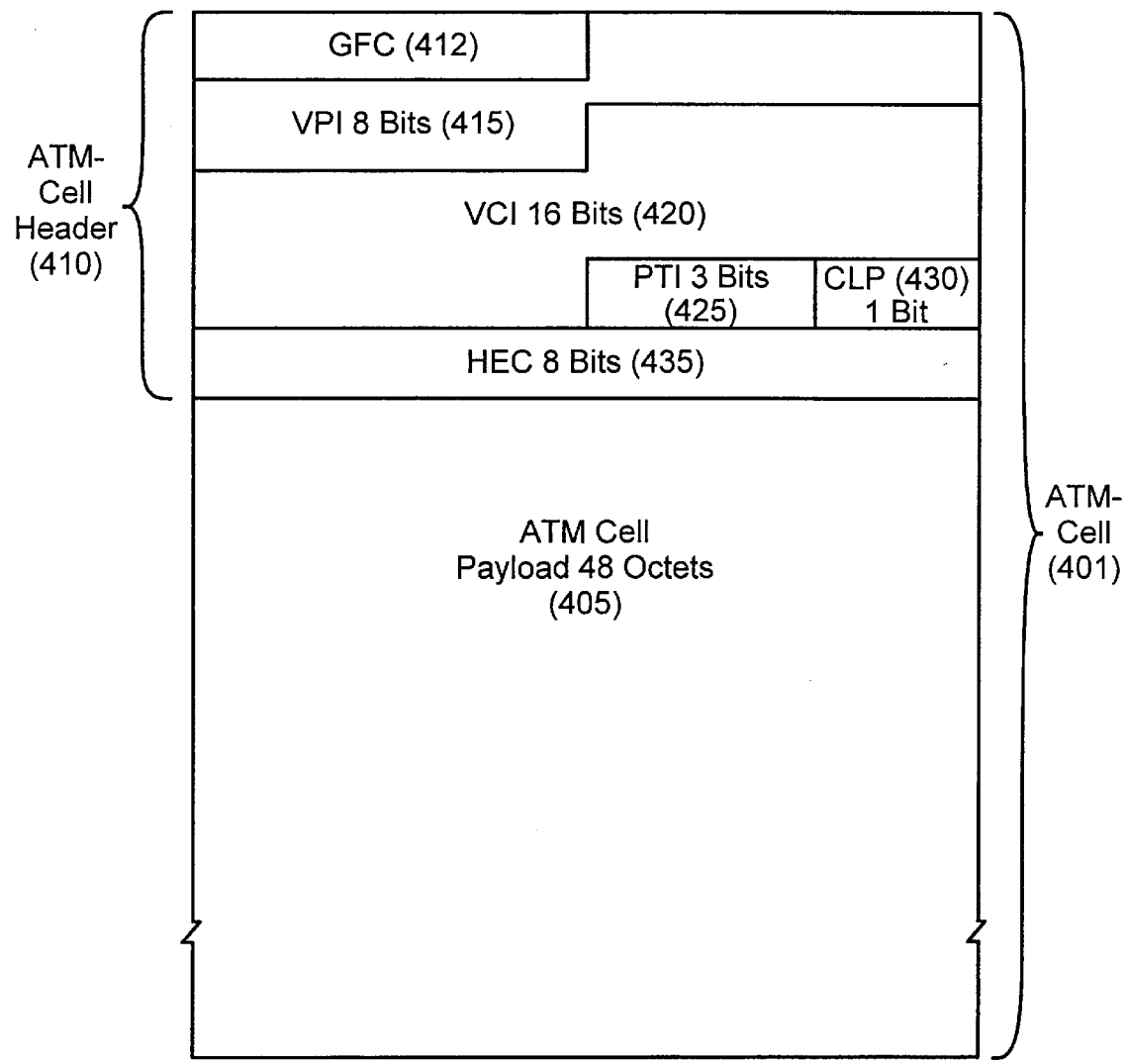
FIG. 4 is a block diagram illustrating the protocol for a standard ATM cell according to the prior art.

It would be advantageous to begin by describing the format of a standard ATM cell header. FIG. 4 illustrates the protocol for a standard ATM cell 401 at the user network interface (i.e., the UNI-interface). ATM cell 401 has a 48 octet payload 405 and a 5 octet header 410. The header, in turn, is divided into a number of sections as follows: a 4 bit Generic Flow Control (GFC) code 412, an 8 bit Virtual Path Identifier (VPI) code 415, a 16 bit Virtual Channel Identifier (VCI) code 420, a 3 bit Payload Type Indicator (PTI) code 425, a 1 bit Cell Loss Priority (CLP) code 430, and an 8 bit Header Error Check (HEC) code 435.

Together, the VPI code 415 and the VCI code 420 of an ATM cell 401 indicate the connection associated with the data stored in the ATM cell payload 405. For example, if the application is a cellular telephone system, a connection may correspond to a specific cellular telephone call. The HEC code 435 is used to identify and, in some cases, correct bit errors that occur in the header during the transmission of the ATM cell 405. The PTI code 425 is typically used, though not exclusively, to distinguish between user data ATM cells and non-user data ATM cells (e.g., resource management ATM cells). For example, a PTI value of 0, 1, 2, or 3 might indicate a user data ATM cell while a PTI value of 4, 5, 6, or 7 might indicate a non-user data ATM cell. The table in FIG. 5 shows that the PTI code 425 may also be used to distinguish between different types of Service Data Units (SDU) and to identify the congestion status of the corresponding connection. In general, the protocol of a standard ATM cell and ATM cell header, including the PTI code is well known in the art.

However, in accordance with the first exemplary embodiment, in which control data 330 is transported in the header of an ATM cell, the PTI code 425 may instead be used to encode the control data 330. For example, the congestion status is often unnecessary information. Therefore, instead of using the PTI code 425 to identify the congestion status of the corresponding connection, as illustrated in the table in FIG. 5, the PTI code 425 in the ATM cell header may be used to identify the source and destination (e.g., AAL1 or AAL5) of the communication data contained in the payload of the corresponding ATM cell, as illustrated in the table in FIG. 6. One skilled in the art will, however, readily understand that other coding schemes involving the ATM cell header may be employed to transport the control data 330.

It is also well known by those skilled in the art that the ATM protocol can support the transportation of low bit rate application data such as cellular voice and video data. When a low bit rate application is involved, it may not be an efficient utilization of bandwidth to insert the control data 330 into every ATM cell as described in the first exemplary method above. Instead, it may be more efficient to pack the control data 330 into special ATM cells referred to as resource management (RM) ATM cells, wherein a single RM-ATM cell might contain the control data needed to synchronize an entire sequence of ATM cells containing communication data associated with one or more AAL layers. Therefore, a second exemplary method will now be described, in which the control data 330 is transported from a transmission station 305 to a receiving station 315 in an RM-ATM cell.

Figure 7:
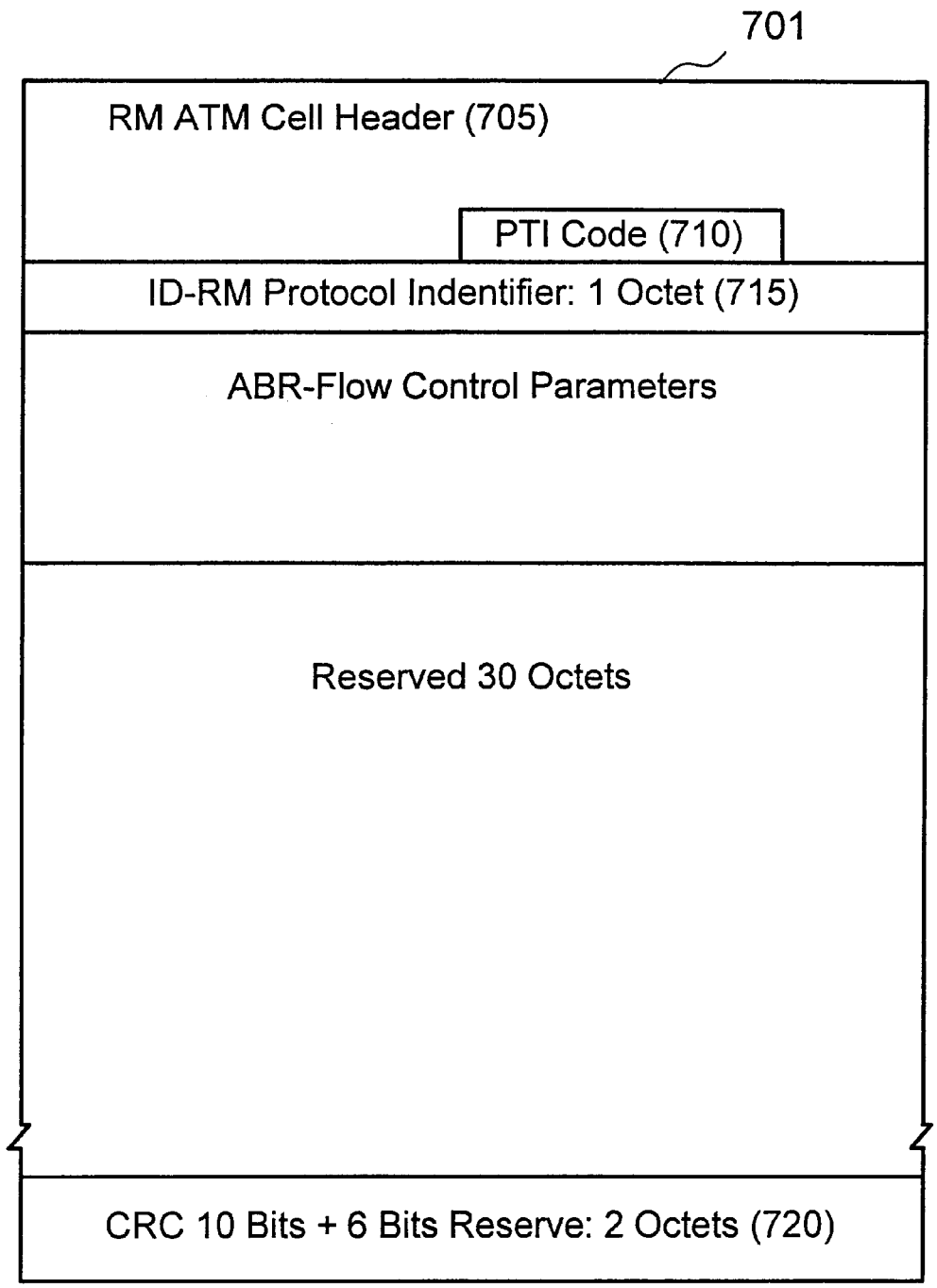
FIG. 7 is a block diagram illustrating the protocol for a standard RM-ATM cell according to the prior art.

To begin the description of the second exemplary embodiment, it would be advantageous to first describe the format of a typical RM-ATM cell. In general, RM-ATM cells are well known to those skilled in the art and they are typically utilized for controlling available bit rate (ABR) data flow. FIG. 7 depicts the format of a standard RM-ATM cell 701. RM-ATM cell 701 contains a header 705 which, in turn, includes a 3 bit PTI code 710 which may be used to distinguish the RM-ATM cell 701 from ordinary ATM cells. In addition, the RM-ATM cell 701 contains an RM Protocol Identifier 715, and a cyclic redundancy code (CRC) 720, which is used for error detection and error correction.

Figure 8:
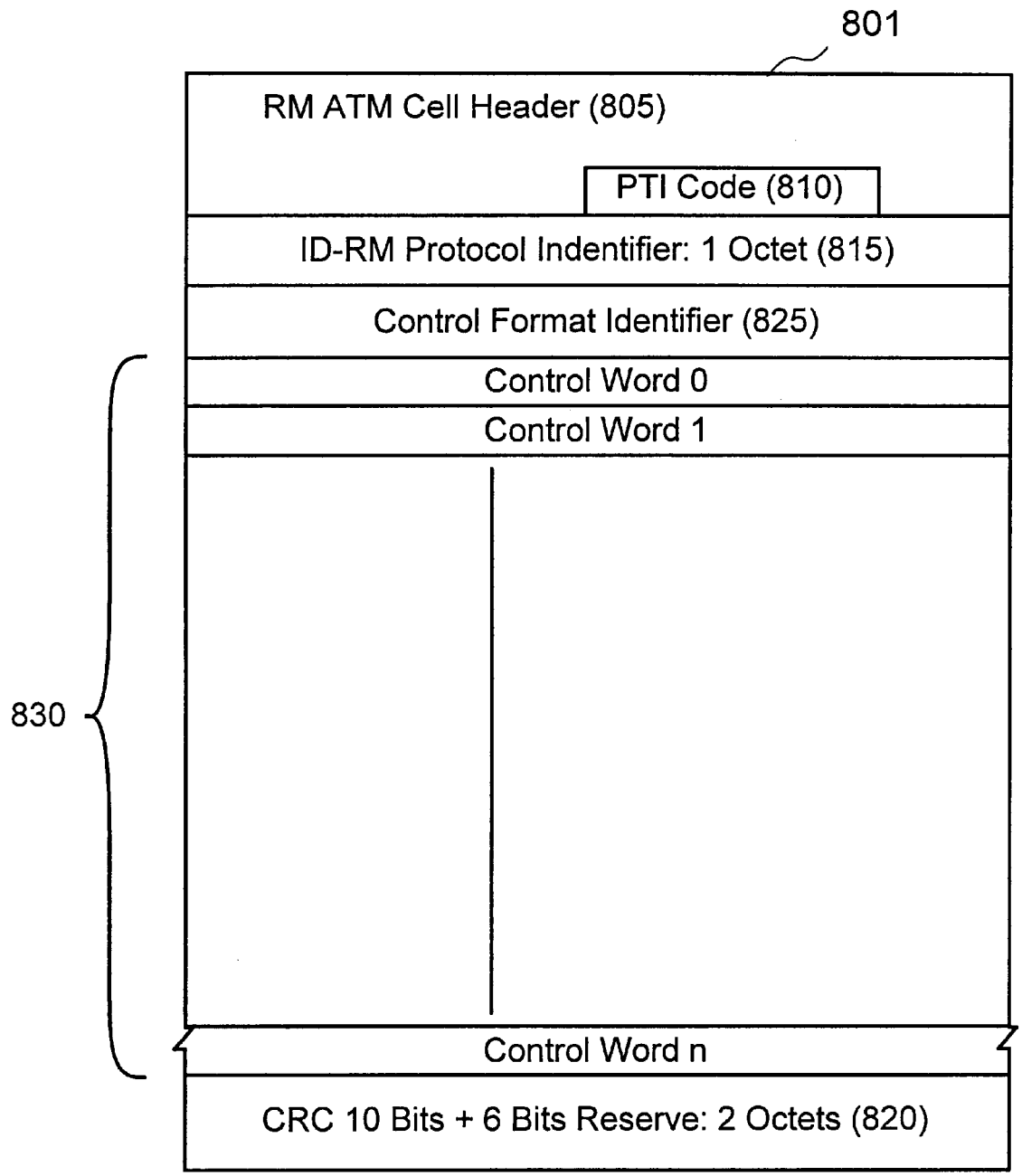
FIG. 8 is a block diagram illustrating the protocol for an RM-ATM cell according to the present invention.

FIG. 8 illustrates how an RM-ATM cell 801 may be encoded for use with the invention. In accordance with the second exemplary embodiment, in which control data 330 is transported by RM-ATM cells, RM-ATM cell 801 contains control data 330 for one or more ATM cell sequences. Like the known RM-ATM cell protocol described above with reference to FIG. 7, RM-ATM cell 801 includes a header 805 which, in turn, includes a 3 bit PTI code 810 to distinguish RM-ATM cell 801 from ordinary ATM cells. RM-ATM cell 801 also contains an RM Protocol Identifier 815 and a CRC 820. Unlike the well known RM-ATM cell 701 protocol described above, RM-ATM cell 801 contains a Control Format Identifier (CFI) code 825 and a number of control words 0 . . . n, wherein each control word contains control data 330 for a select one of n+1 ATM cell sequences, and wherein, each of the n+1 ATM cell sequences may include ATM cells associated with one or more AAL layers.

Figure 9:
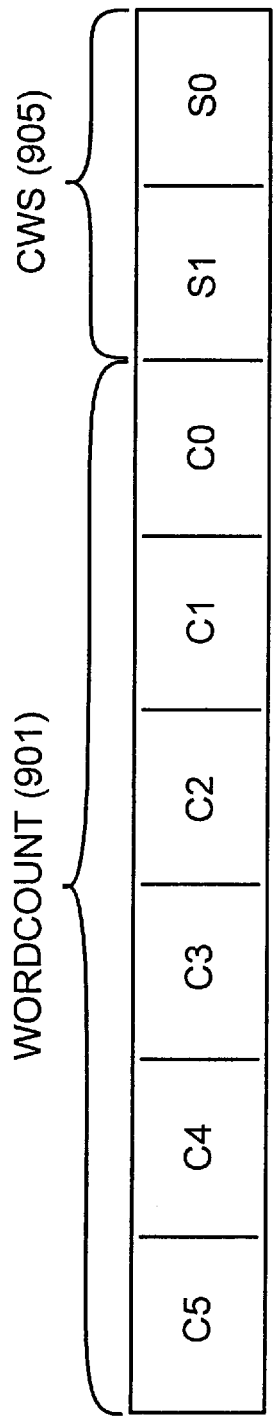
FIG. 9 is a diagram illustrating an exemplary protocol for the CFI code.

FIG. 9 illustrates a protocol for the CFI code 825, wherein the wordcount 901 defines the number of control words 830 (i.e., n+1) contained in the RM-ATM cell 801 while the Control Word Structure (CWS) code 905 defines the way in which control words 830 are packed into the RM-ATM cell 801. Referring back to FIG. 8, the control words 830 may be packed as 8 bit (one octet) words, or 16 bit words (two octets), or a combination of one octet and two octet control words.

Figure 11:
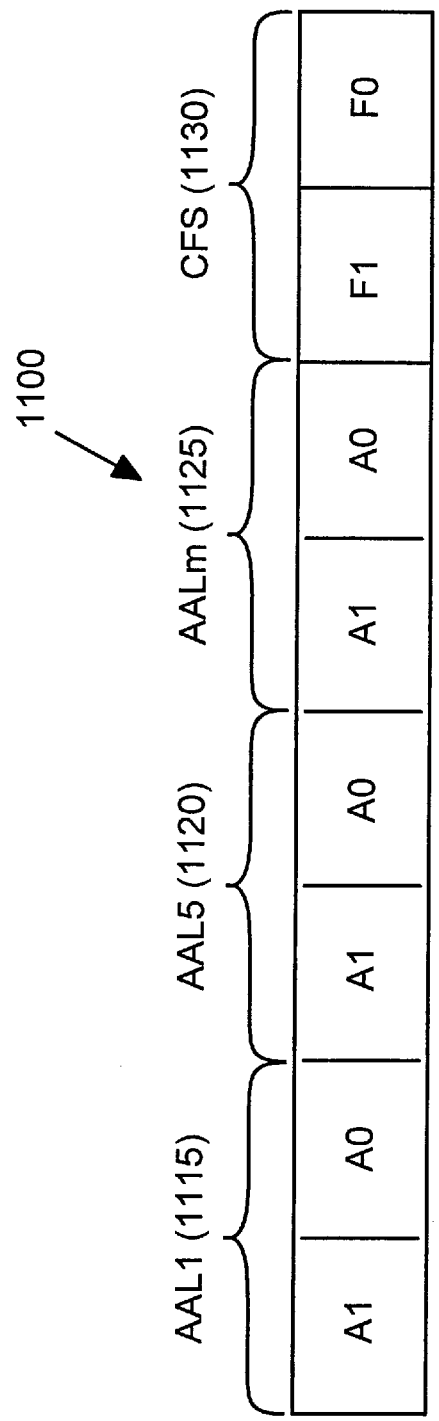
FIG. 11 illustrates an alternative protocol for a control word in an RM-ATM cell.
Figure 10A:
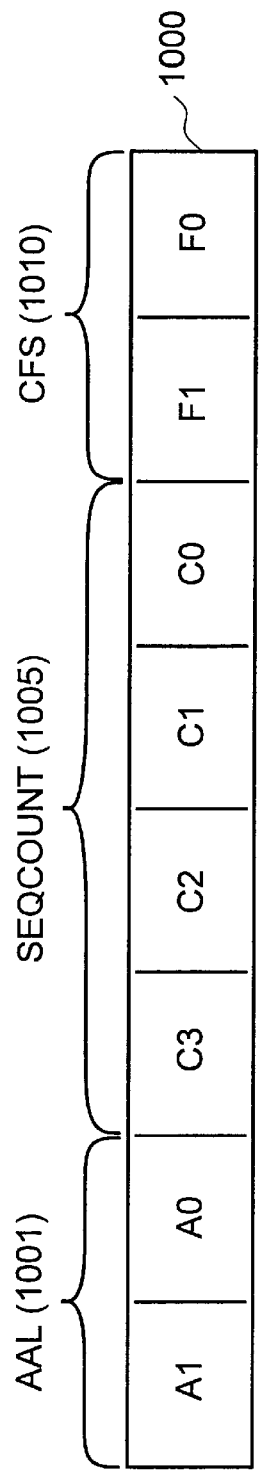
FIGS. 10A and 10B illustrate an exemplary protocol for a control word in an RM-ATM cell and an exemplary ATM cell sequence respectively.

FIG. 10A illustrates an exemplary protocol 1000 for each of the control words 830. In accordance with the control word protocol 1000, AAL 1001 denotes the address of the AAL layer associated with the communication data in the corresponding ATM cell sequence. SEQCOUNT 1005 defines the number of ATM cells in the corresponding ATM cell sequence. The Control Format Selector (CFS) code 1010 identifies the control word protocol (e.g., the CFS code 1010 may indicate a control word format as illustrated in FIG. 10A or as illustrated in FIG. 11). With this information, the AAL-demux 310 can properly identify and direct the communication data in each ATM cell by counting the ATM cells as they are received.

Figure 10B:
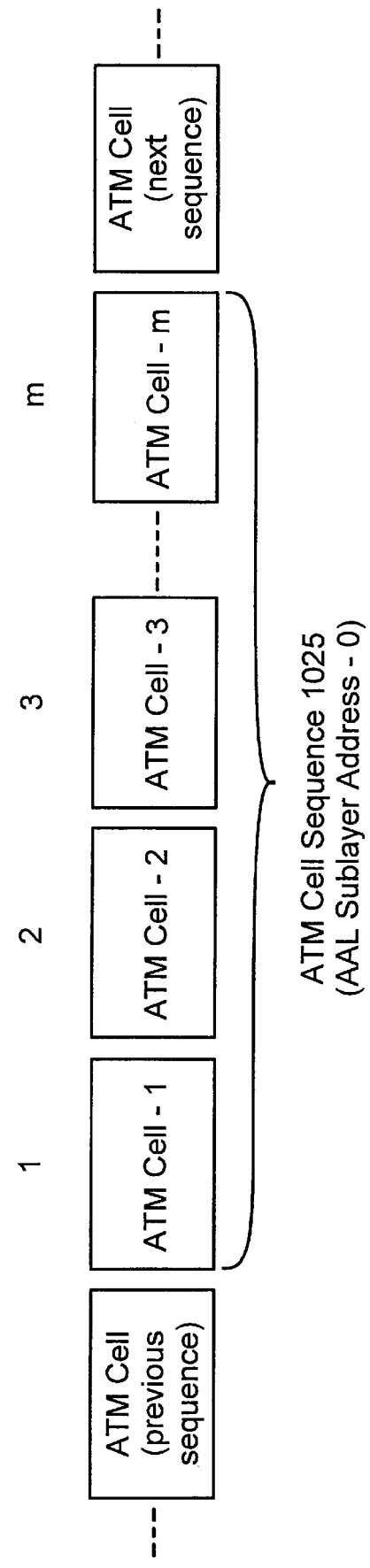

For example, FIG. 10B illustrates a sequence of ATM cells 1025. Each ATM cell 1 . . . m contains communication data associated with the AAL layer whose address is 0, as defined in a previously-received control word corresponding to the ATM cell sequence 1025. If the control word 1000 in FIG. 10A is the previously received control word corresponding to the ATM cell sequence 1025, AAL 1001 must reflect the address 0, and SEQCOUNT must reflect the number m.

FIG. 11 illustrates a second exemplary protocol for control words 830 in RM-ATM cell 801. This second exemplary protocol is best suited for use when each AAL layer is generating the same number of ATM cells per sequence (i.e., with a predefined SEQCOUNT). In accordance with the control word protocol 1100, the control data 330 consists of the AAL address for the next three ATM cell sequences, for example, the AAL addresses corresponding to AAL1 1115, AAL5 1120, and AALm 1125. As stated above, the CFS code 1130 identifies the Control Word protocol for the AAL-demux 207 and distinguishes the Control Word protocol from, for example, the Control Word protocol illustrated in FIG. 10A.

A third exemplary embodiment will now be described, in which control data 330 is transported from a transmission station 305 to a receiving station 315 in the payload of an otherwise standard ATM cell.

Figure 12:
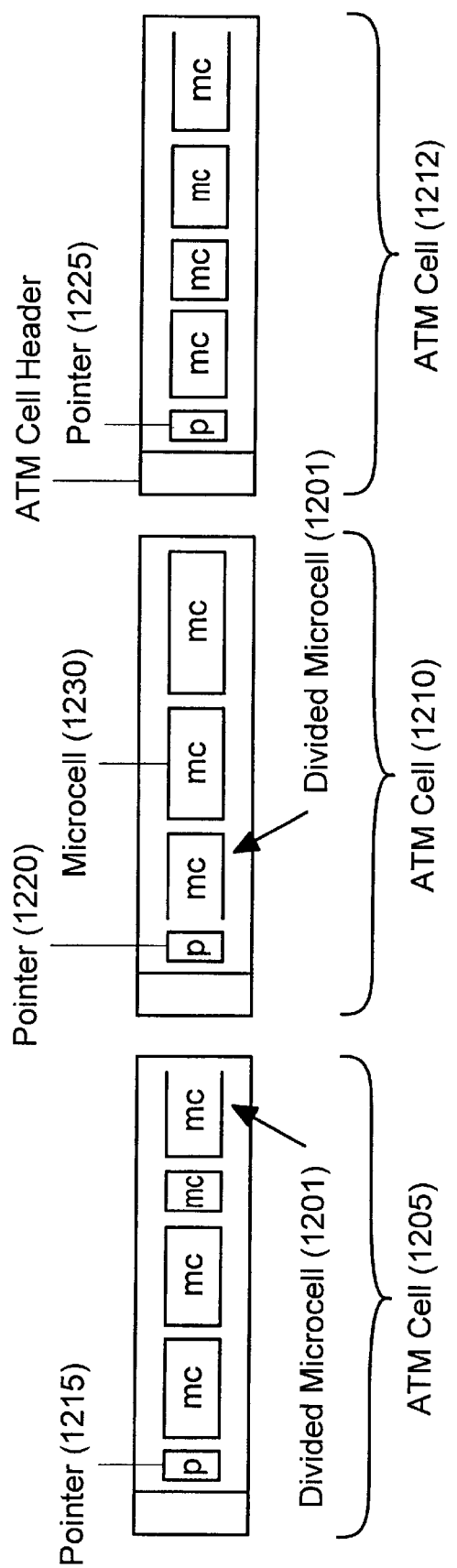
FIG. 12 is a diagram illustrating the relationship between microcells and ATM cells according to the prior art.

First, it would be advantageous to introduce the concept of microcells. As mentioned above, ATM does not ordinarily utilize bandwidth efficiently when it is used for transporting low bit rate application data. Prior methods have improved bandwidth utilization when ATM is used to transport low bit rate data by packaging the low bit rate data from various communication channels into data packets called microcells. Although microcells vary in length, they are otherwise physically similar to ATM cells. For example, microcells also contain a header portion and a payload portion. As illustrated in FIG. 12, microcells (mc) are continuously generated by the AALm (not shown) and multiplexed into the payload of ATM cells before being transported to a receiving station 315. By fitting as many microcells as possible into the payload of each ATM cell, for example, ATM cells 1205, 1210, and 1212, bandwidth utilization is dramatically improved. However, bandwidth utilization may be further improved by allowing a microcell, for example, microcell 1201, to be divided between two (or more) adjacent ATM cells, for example, ATM cells 1205 and 1210, when the microcell 1201 does not otherwise fit in its entirety into the remaining space of the first ATM cell payload.

In order to maintain microcell alignment at a receiving station 315 (i.e., the ability of the receiving station to identify the first and last octet of each microcell), microcell pointers are typically inserted into the payload of each ATM cell immediately after the header, as illustrated by microcell pointers (p) 1215, 1220, and 1225. More specifically, each pointer is one octet in length and it identifies the location of the first octet of the next microcell in the corresponding ATM cell payload. For example, pointer 1220 identifies the location of the first octet of microcell 1230. Therefore, the receiving station 315 will know that the octets preceding microcell 1230 in ATM cell 1210 are associated with microcell 1201.

Figure 13:
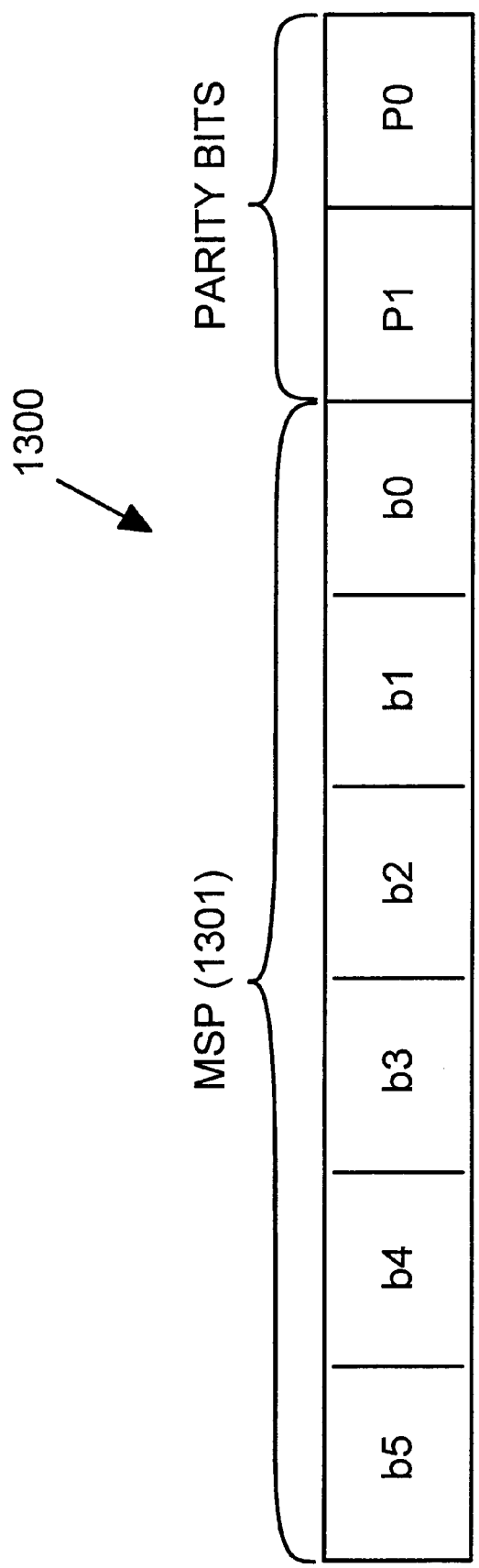
FIG. 13 illustrates a standard protocol for microcell pointers according to the prior art.

FIG. 13 illustrates a standard protocol 1300 for microcell pointers 1215, 1220, and 1225. As shown in FIG. 13, each microcell pointer 1215, 1220, and 1225 contains a 6 bit microcell start pointer (MSP) 1301 and two parity bits P0 and P1. The MSP 1301 identifies the location of the first octet of the next microcell in the corresponding ATM cell, as described above, while the two parity bits verify the accuracy of the bit values in the MSP 1301. In general, the use of microcell pointers is well known by those of skill in the art.

Figure 14:
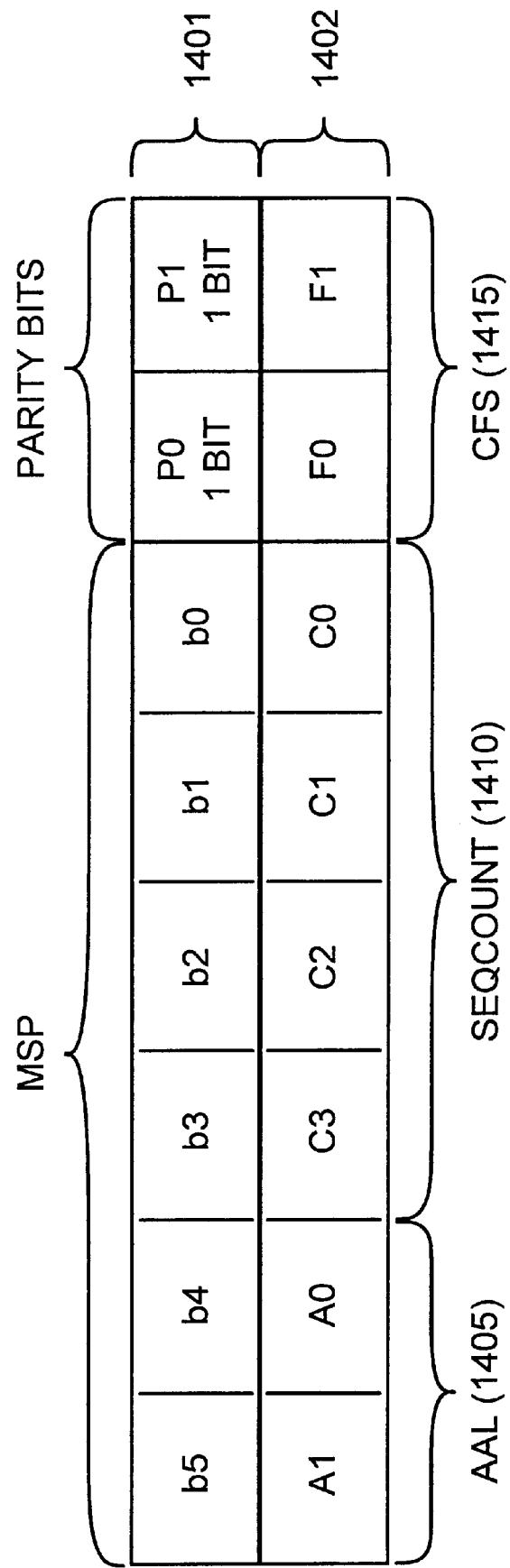
FIG. 14 illustrates a two octet microcell pointer, wherein the second octet is a control word containing control data for an intervening ATM cell sequence.

Referring now to FIG. 14, in accordance with the third exemplary embodiment, in which control data 330 is transported in the payload of an ATM cell containing microcells, a 1 octet pointer 1401, similar in appearance and function to the microcell pointers described above, is extended to include a second octet 1402. The control data 330 is used here to identify an intervening ATM cell sequence, for example, intervening ATM cell sequence 1525 (see FIG. 15), where ATM cells 1 . . . N contain communication data from an AAL layer that does not package the communication data in microcells. More, specifically, the control word 1402 is divided into an AAL 1405, a SEQCOUNT 1410, and a CFS 1415. The AAL 1405 defines the address of the AAL layer associated with the communication data stored in the intervening ATM cell sequence 1525. The SEQCOUNT 1410 defines the number of intervening ATM cells (e.g., N number of ATM cells), and the CFS 1415 defines the format of the control word 1402.

Figure 15:
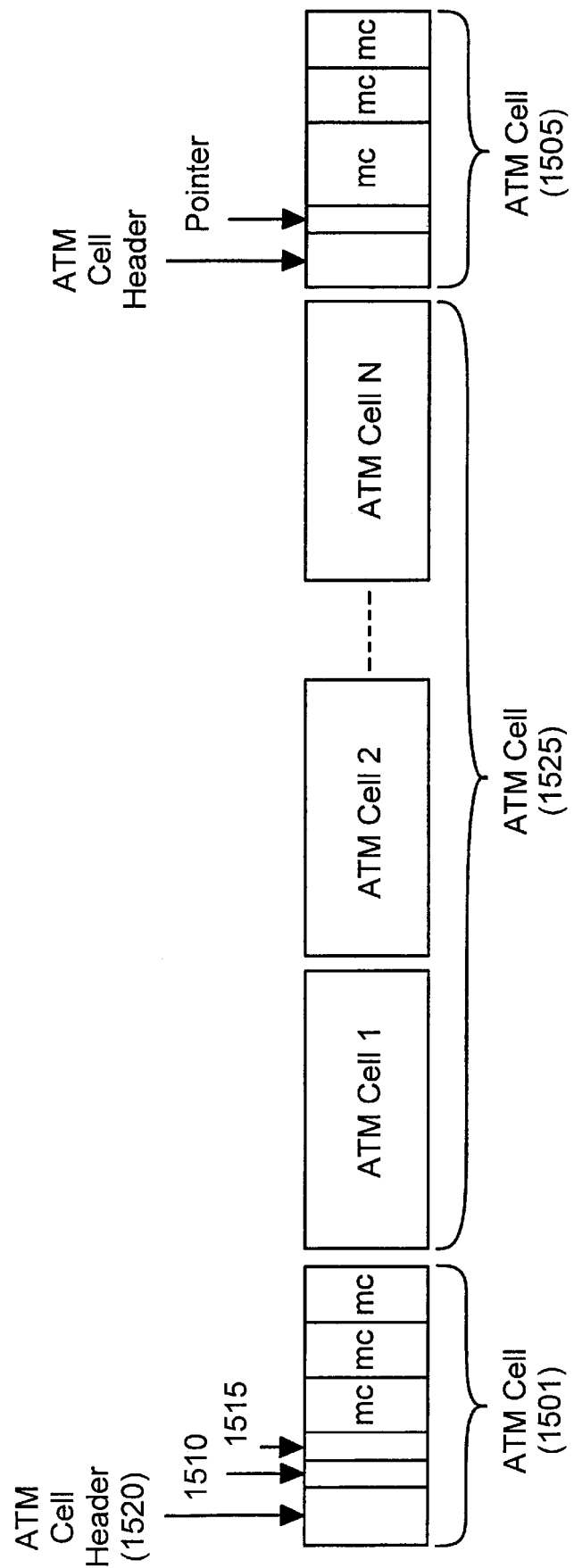
FIG. 15 illustrates an intervening ATM cell sequence between two ATM cells containing microcells.

Referring to FIG. 15 to better illustrate the concept of the third exemplary embodiment, ATM cells 1501 and 1505 contain microcells, whereas intervening ATM cells 1 . . . N do not contain microcells. The microcell pointer 1401 and the 1 octet extension containing the control data 330 are positioned as illustrated by octets 1510 and 1515 respectively, just after the ATM cell header 1520 in ATM cell 1501. Furthermore, AAL 1405 would reflect the address of the AAL layer associated with the data stored in the ATM cell sequence 1525 and the SEQCOUNT 1410 would reflect the value N.

Figure 16:
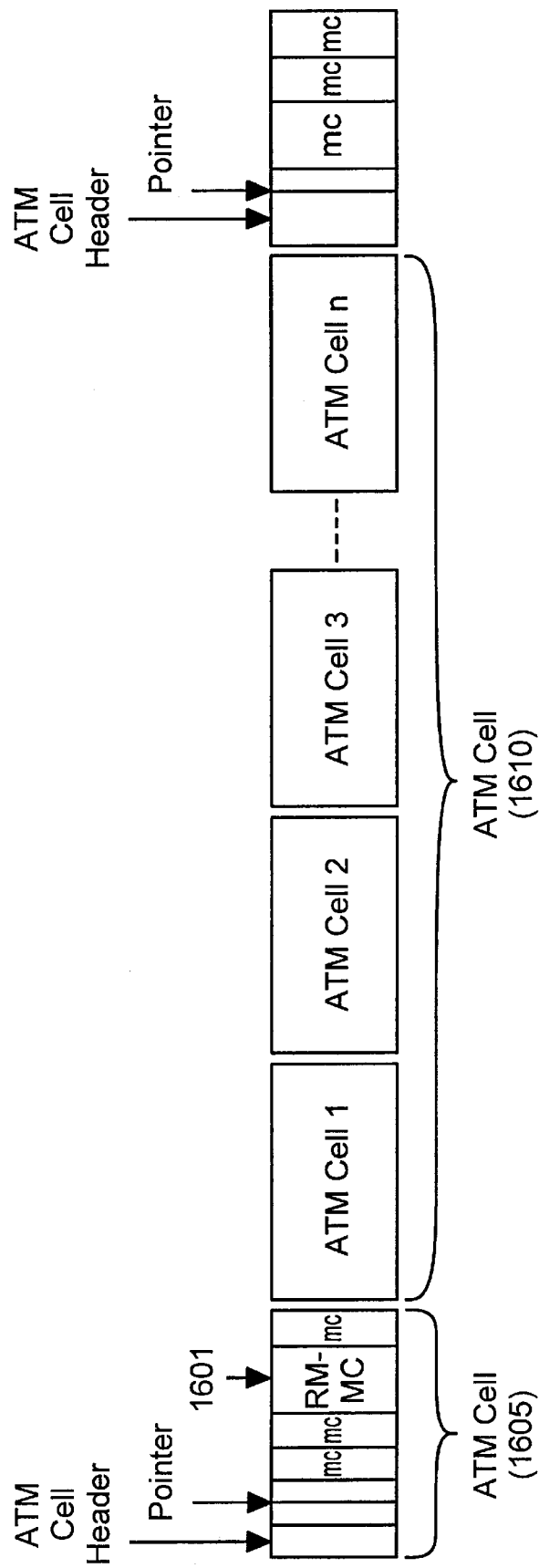
FIG. 16 illustrates the use of an RM-ATM cell to convey control data for an intervening sequence of ATM cells.

A fourth exemplary embodiment will now be described, in which control data 330 is transported from a transmission station 305 to a receiving station 315 in the payload of a special microcell, referred to as a resource management (RM) microcell. This fourth exemplary embodiment may be used most efficiently when the application is producing short, rapid bursts of data because RM microcells can be generated and inserted at any location in the payload of an ATM cell. In contrast, the 1 octet pointer and the 1 octet extension described in the third exemplary embodiment above can only be inserted at one location in the ATM cell payload (e.g., just after the ATM cell header). Referring to FIG. 16, a RM microcell 1601 in ATM cell 1605 contains the control data 330 needed to maintain the alignment of the AAL-demux 310 at the receiving station 315 (not shown) with respect to intervening ATM cell sequence 1610, in which ATM cells 1 . . . n do not contain microcells.

Figure 17:
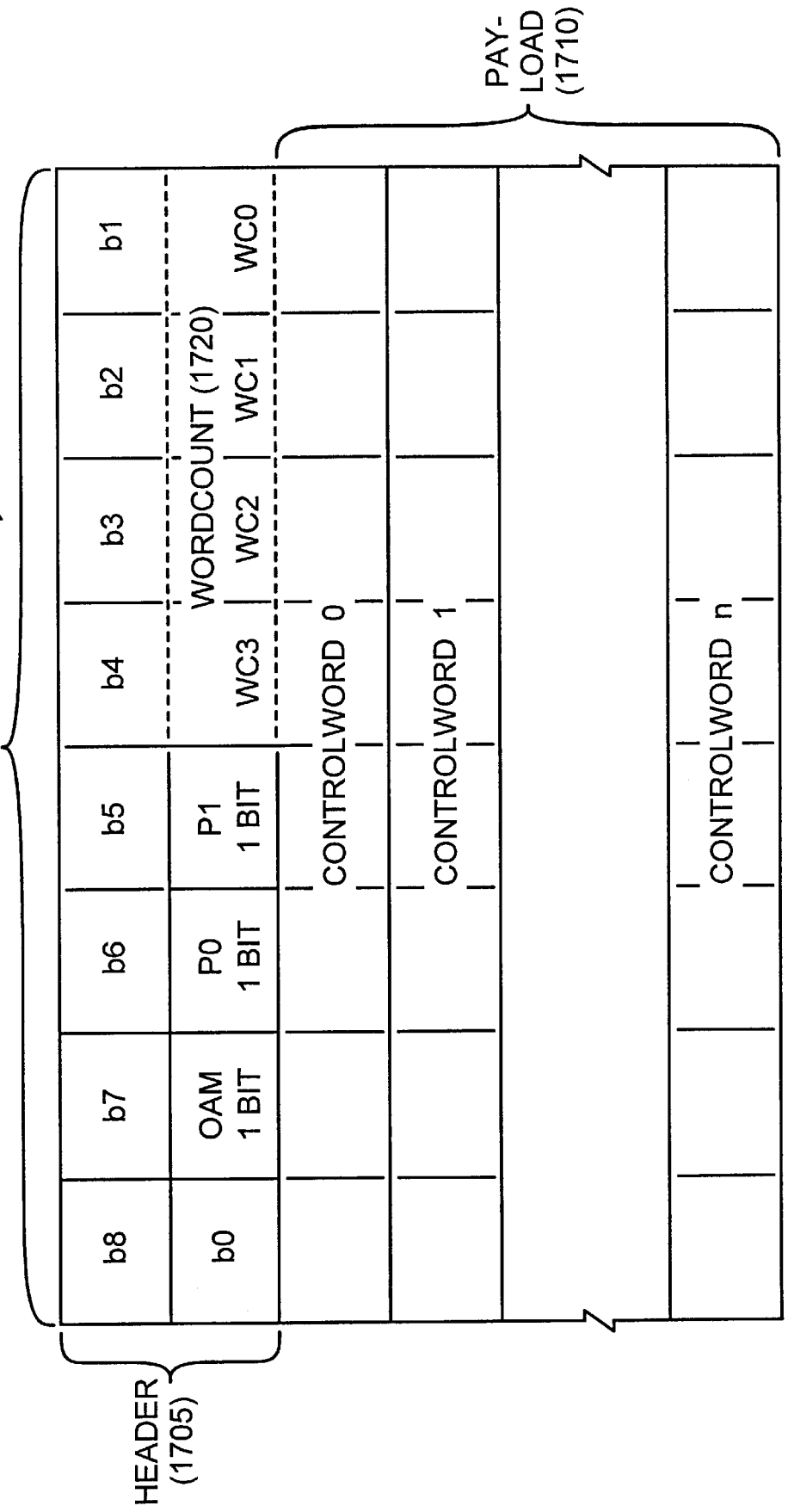
FIG. 17 is a diagram illustrating an exemplary protocol for an RM-ATM cell containing control words corresponding ATM cell sequences.

FIG. 17 illustrates an exemplary format for an RM-microcell 1701. As shown in FIG. 17, each RM microcell contains a header portion 1705 and a payload portion 1710. The header portion 1705 may be divided into a first octet which contains an 8 bit Connection Identifier (CID) code 1715 and a second octet containing, among other things, two parity bits P0 and P1, and a 4 bit WORDCOUNT 1720, wherein WORDCOUNT 1720 defines the number of control words (i.e., n+1) contained in the payload portion 1710 of the RM-microcell 1701.

Figure 18:
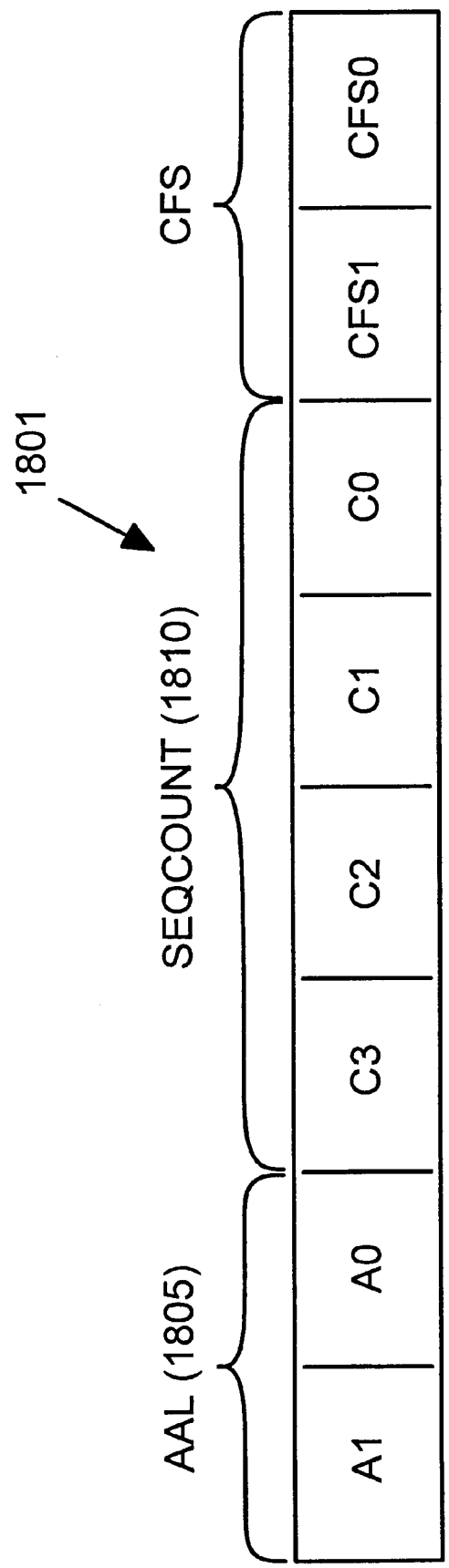
FIG. 18 illustrates an exemplary protocol for a control word contained in an RM-ATM cell.

FIG. 18 illustrates an exemplary protocol for a control word 1801. This protocol is identical to the control word protocol described above with respect to FIG. 10A. As in FIG. 10A, the AAL 1805 is a 2 bit code that defines the address of the AAL layer associated with the data stored in a corresponding ATM cell sequence. The SEQCOUNT 1810 defines the number of ATM cells in the ATM cell sequence, and the CFS identifies the format of the control word 1801.

Figure 19:
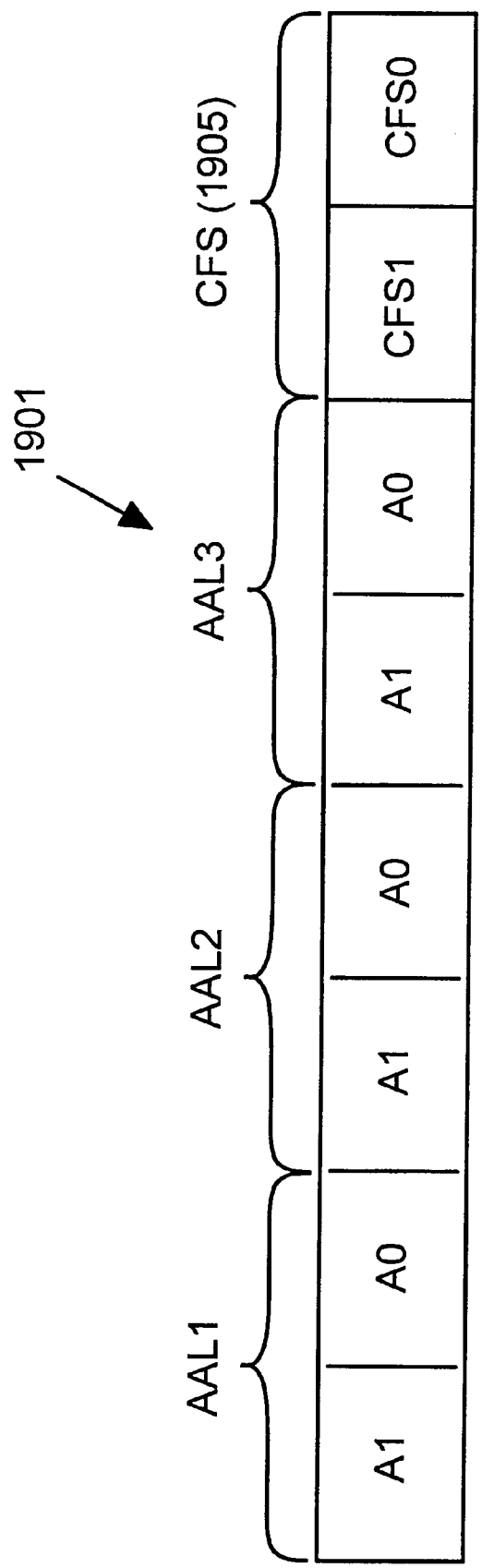
FIG. 19 illustrates an alternative exemplary protocol for a control word contained in an RM-ATM cell.

FIG. 19 illustrates a second exemplary format for a control word 1901. This protocol is identical to the control work protocol described above with respect to FIG. 11. If each AAL layer produces a predetermined number of ATM cells per ATM cell sequence (i.e., each ATM cell sequence having the same SEQCOUNT), the alignment of the AAL-demux 310 with respect to the ATM cells in each ATM cell sequence can be maintained by simply providing the AAL address associated with each sequence. As explained above, the CFS 1905 defines the format of the control word 1901.

The AAL-mux 207 and the AAL-demux 310 will now be described in greater detail. As stated above, the AAL-mux 207 is responsible for generating control data and inserting the control data into the ATM cell stream so that the communication data stored in the ATM cells can be recovered at the receiving station 315 by the AAL-demux 310 and directed to the appropriate AAL layers.

Figure 20:
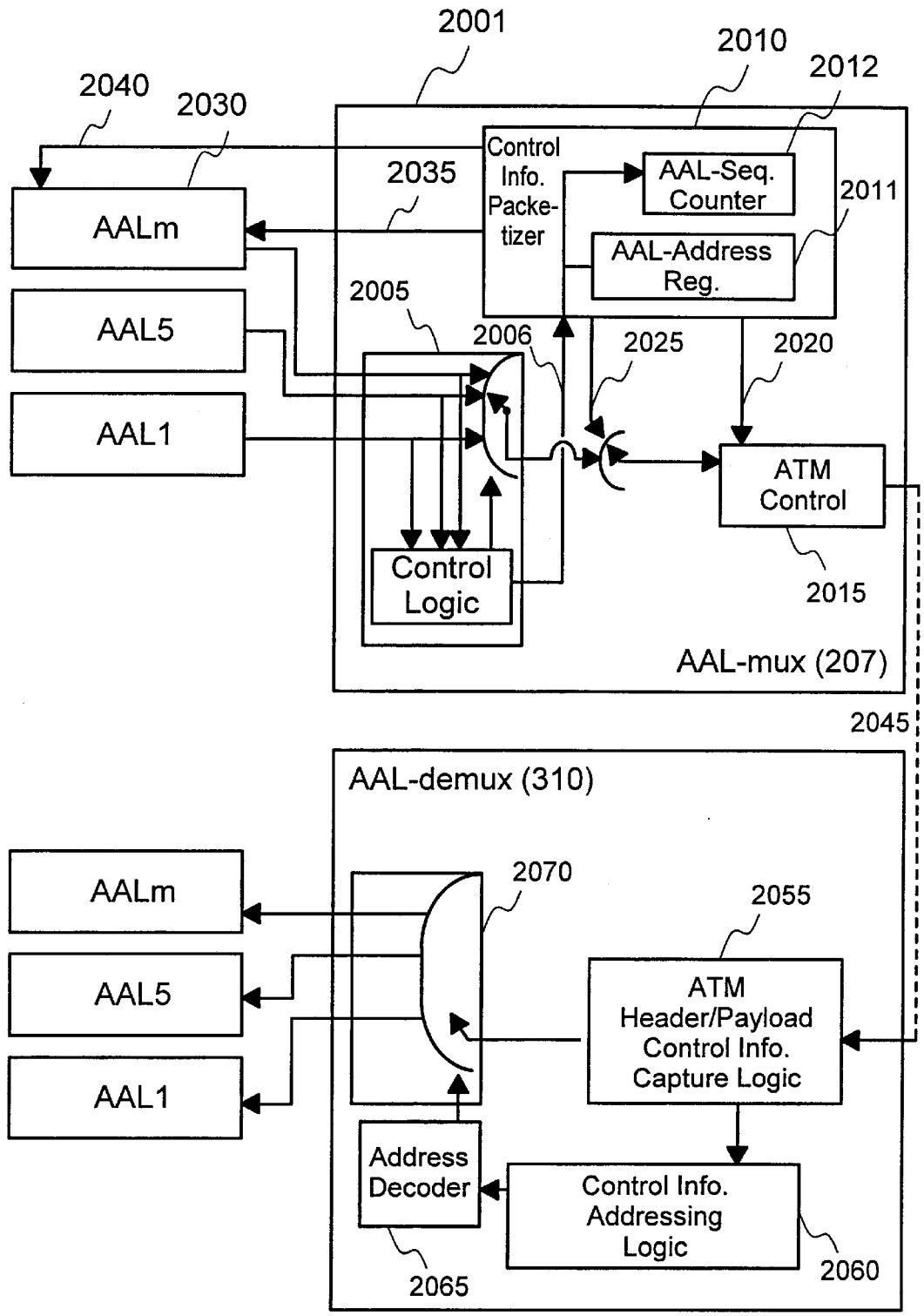
FIG. 20 is a functional block diagram of the AAL multiplexer in a transmission station and the AAL demultiplexer in a receiving station.

FIG. 20 illustrates a functional block diagram of a Hybrid AAL 2001, including a number of ATM adaptation layers 2030 and an AAL-mux 207. The Hybrid AAL 2001 is located at transmission station 305 (not shown). FIG. 20 also shows the AAL-demux 310 and the corresponding ATM adaptation layers located at receiving station 315 (not shown).

Initially, hybrid data is directed to the appropriate AAL 2030, in the Hybrid AAL 2001, by the application layer 102. Hybrid data, as explained above, refers to data generated by different applications or a single application that generates more than one type of data (e.g., voice data and video data), wherein each type of data typically (though not necessarily) has its own unique data transfer format. Each ATM adaptation layer 2030 inserts a particular type of data, having a distinctly different data transfer format, into the payload of one or more ATM cells, wherein each ATM cell exhibits a common data transfer format. Each AAL 2030 then sends the one or more ATM cell payloads to a control logic multiplexer 2005. For each sequence of ATM cells, the control logic multiplexer 2005 identifies the corresponding AAL by its address and the number of ATM cells which make up the ATM cell sequence. This control information is then sent, via data line 2006, to the control information packetizer 2010, which stores the information in an AAL address register 2011 and an AAL sequence counter 2012 respectively. The control information packetizer 2010 then packages the control data in accordance with one of the four exemplary embodiments described above.

For instance, if the control data is to be transferred in the header of an ATM cell, in accordance with the first exemplary transfer embodiment, the AAL address information, stored in the AAL address register 2011, is encoded and transferred, via data line 2020, to the ATM-control device 2015. In general, ATM-control device 2015 generates and attaches ATM cell headers to the corresponding ATM cell payloads which are supplied by the control logic multiplexer 2005. More specifically, ATM-control device 2015 inserts the AAL address, previously stored in the AAL address register 2011, in place of the PTI code 425 in the appropriate ATM cell header.

If the control data is to be transferred in a separate RM-ATM cell, in accordance with the second exemplary transfer embodiment, the AAL address and ATM cell sequence count information, previously stored in the AAL address register 2011 and the AAL sequence counter 2012 respectively, is transferred to a control word in an RM-ATM cell payload, as described above, and the RM-ATM cell payload is inserted into the ATM cell stream as illustrated by control data line 2025. The ATM control device 2015 then attaches an appropriate ATM cell header which must identify the ATM cell as an RM-ATM cell.

If the control data is to be transferred in the payload of an ATM cell containing microcells, in accordance with the third exemplary transfer embodiment, the AAL address information and ATM cell sequence count information, previously stored in the AAL address register 2011 and the AAL sequence counter 2012 respectively, are stored in a single octet, as described above, and transferred to AALm 2030, via control data line 2035. The AALm 2030, which generates ATM cell payloads containing microcells, as explained above, then inserts the control data into the appropriate ATM cell payload.

If the control information is to be transferred in an RM-microcell, in accordance with the fourth exemplary transfer embodiment, the AAL address information and the ATM cell sequence count information, previously stored in the AAL address register 2011 and the AAL sequence counter 2012 respectively, is transferred to the AALm 2030, via control data line 2040, which inserts the control data into a control word located in the payload of an RM-microcell. The AALm 2030 then multiplexes the RM-microcell into the payload of an otherwise standard ATM cell containing other microcells. The AALm 2030 then sends the ATM cell payload containing the RM microcell to the Control Logic Multiplexer 2005. The Control Logic Multiplexer then inserts the ATM cell payload into a single ATM stream along with ATM cell payloads generated by the other AALs.

The transmission station 305 continuously transmits the single stream of ATM cells, containing the data from the various ATM adaptation layers 2030, to the receiving station 315 which, in turn, contains the AAL-demux 310. As the ATM cells arrive at the AAL-demux 2050, Control Information Capture Logic 2055 extracts the control data from the ATM cell header, from the ATM cell payload, from an RM-ATM cell, or from an RM-microcell, depending upon the exemplary transfer embodiment used. The AAL address information and the ATM cell sequence number information is then transferred to Control Information Addressing Logic 2060 and Address Decoder 2065, which use this information to control a demultiplexer 2070. Demultiplexer 2070 directs the communication data stored in the various ATM cells to the appropriate AAL layers (e.g., AAL1, AAL5, AALm) located at the receiving station 315, in accordance with the control data.

Figure 21:
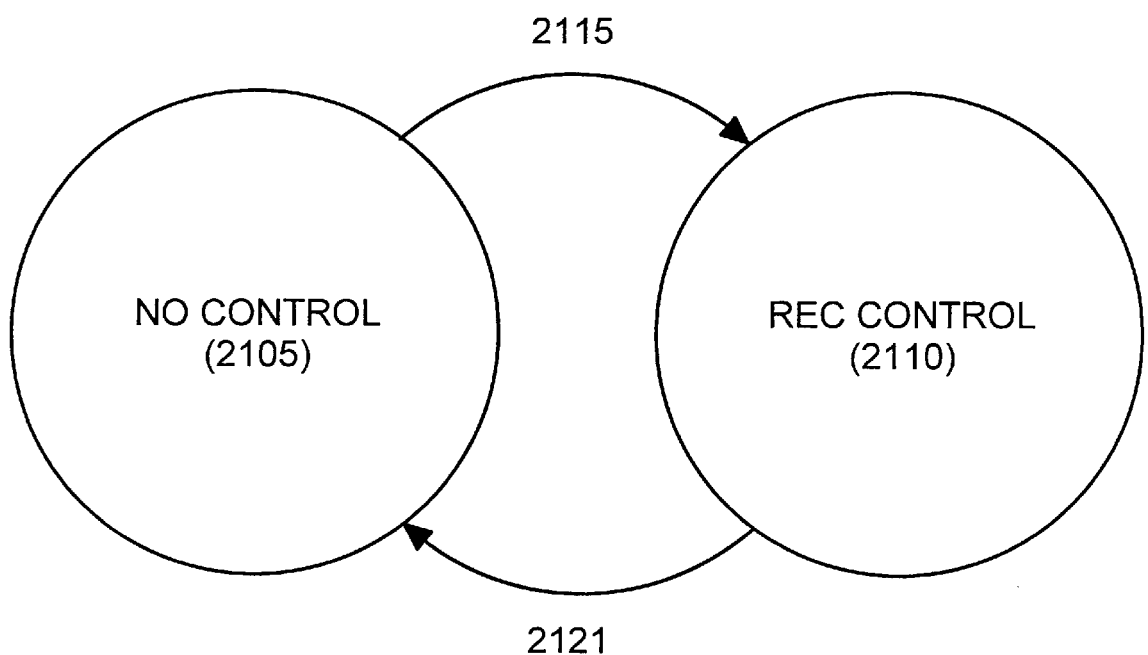
FIG. 21 is a state diagram for the AAL demultiplexer in the receiving station.

FIG. 21 illustrates a state diagram for the AAL-demux 310. If there is no control data for a sequence of incoming ATM cells, the AAL-demux 310 is set to a NO CONTROL state 2105. When AAL-demux 310 is in the NO CONTROL state 2105, the incoming ATM cells are transferred to a default AAL layer. The default AAL layer may be any one of the current AAL layers (e.g., AAL1, AAL5, AALm) as configured during start-up operations. The AAL-demux 310 will transition from the NO CONTROL state 2105 to a RECEIVE CONTROL state 2110, as illustrated by arrow 2115, as soon as control data is received in accordance with one of the four exemplary control data transfer embodiments described above. The AAL-demux 310 will transition back to the NO CONTROL state 2105, as illustrated by arrow 2121, once the control data has been consumed (i.e., used) assuming no additional control data has been received.

It should be pointed out that the AAL-mux 2001 and the AAL-demux 310 may be constructed using control logic devices that one of ordinary skill in the art will readily understand. Moreover, while only preferred embodiments were specifically illustrated and described above, it will be appreciated that many modifications and variations of the present invention are possible in light of the above teachings and within the purview of the appended claims without departing from the spirit and intended scope of the invention.

What is claimed is:

1. In a telecommunication system, a method of transmitting data packets to a receiving station, comprising the steps of:

receiving hybrid data from at least one telecommunication application, wherein the hybrid data comprises a plurality of data transfer formats;

inserting data having a first data transfer format into at least one data packet;

inserting data having a second data transfer format into at least one data packet;

multiplexing the data packets into a single data stream;

generating control data for the at least one data packet corresponding to the data having a first data transfer format;

generating control data for the at least one data packet corresponding to the data having a second data transfer format;

multiplexing the control data into the single data stream;

transmitting the data packets and the control data to the receiving station over a common telecommunication channel;

wherein said transmitting step includes transmitting the control data to the receiving station over the common telecommunication channel in a header portion of an Asynchronous Transfer Mode cell, wherein all data packets exhibit a common data transfer protocol.

2. A method in accordance with claim 1, wherein said step of transmitting the control data to the receiving station over the common telecommunication channel in a header portion of an Asynchronous Transfer Mode cell comprises the step of:

inserting the control data into a Payload Type Indicator field in the header portion of an Asynchronous Transfer Mode cell.

3. An apparatus in accordance with claim 1, wherein the common data transfer protocol is an Asynchronous Transfer Mode protocol and the data packets are Asynchronous Transfer Mode cells.

4. A method in accordance with claim 1, wherein the control data indicates the number of data packets corresponding to the data having a first data transfer format and the number of data packets corresponding to the data having a second data transfer format.

5. In a telecommunication system, a method of transmitting data packets to a receiving station, comprising the steps of:

receiving hybrid data from at least one telecommunication application, wherein the hybrid data comprises a plurality of data transfer formats;

inserting data having a first data transfer format into at least one data packet;

inserting data having a second data transfer format into at least one data packet;

multiplexing the data packets into a single data stream;

generating control data for the at least one data packet corresponding to the data having a first data transfer format;

generating control data for the at least one data packet corresponding to the data having a second data transfer format;

multiplexing the control data into the single data stream;

transmitting the data packets and the control data to the receiving station over a common telecommunication channel;

wherein said transmitting step includes transmitting the control data to the receiving station over the common telecommunication channel in a payload portion of an Asynchronous Transfer Mode cell;

wherein the Asynchronous Transfer Mode cell is a resource management Asynchronous Transfer Mode cell, wherein all data packets exhibit a common data transfer protocol.

6. In a telecommunication system, a method of transmitting data packets to a receiving station, comprising the steps of:

receiving hybrid data from at least one telecommunication application, wherein the hybrid data comprises a plurality of data transfer formats;

inserting data having a first data transfer format into at least one data packet;

inserting data having a second data transfer format into at least one data packet;

multiplexing the data packets into a single data stream;

generating control data for the at least one data packet corresponding to the data having a first data transfer format;

generating control data for the at least one data packet corresponding to the data having a second data transfer format;

multiplexing the control data into the single data stream;

transmitting the data packets and the control data to the receiving station over a common telecommunication channel;

wherein said transmitting step includes transmitting the control data to the receiving station over the common telecommunication channel in a payload portion of an Asynchronous Transfer Mode cell;

wherein the Asynchronous Transfer Mode cell contains at least one microcell and wherein the control data is inserted into an extended portion of a microcell start pointer, wherein all data packets exhibit a common data transfer protocol.

7. In a telecommunication system, a method of transmitting data packets to a receiving station, comprising the steps of:

receiving hybrid data from at least one telecommunication application, wherein the hybrid data comprises a plurality of data transfer formats;

inserting data having a first data transfer format into at least one data packet;

inserting data having a second data transfer format into at least one data packet;

multiplexing the data packets into a single data stream;

generating control data for the at least one data packet corresponding to the data having a first data transfer format;

generating control data for the at least one data packet corresponding to the data having a second data transfer format;

multiplexing the control data into the single data stream;

transmitting the data packets and the control data to the receiving station over a common telecommunication channel;

wherein said transmitting step includes transmitting the control data to the receiving station over the common telecommunication channel in a payload portion of a microcell, wherein all data packets exhibit a common data transfer protocol.

8. A method in accordance with claim 7, wherein the microcell is a resource management microcell.

9. In a telecommunication system, an apparatus for transmitting data packets to a receiving station comprises:

means for receiving hybrid data from at least one telecommunication application, wherein the hybrid data comprises a plurality of data transfer formats;

means for inserting data having a first data transfer format into at least one data packet;

means for inserting data having a second data transfer format into at least one data packet;

means for multiplexing the data packets into a single data stream;

means for generating control data for the at least one data packet corresponding to the data having a first data transfer format;

means for generating control data for the at least one data packet corresponding to the data having a second data transfer format;

means for multiplexing the control data into the single data stream;

means for transmitting the data packets and the control data over a common telecommunication channel, including means for transmitting the control data to the receiving station over the common telecommunication channel in a header portion of an Asynchronous Transfer Mode cell, wherein all data packets exhibit a common data transfer protocol.

10. An apparatus in accordance with claim 9, wherein said means for transmitting the control data to the receiving station over the common telecommunication channel in a header portion of an Asynchronous Transfer Mode cell comprises:

means for inserting the control data into a Payload Type Indicator field in the header portion of an Asynchronous Transfer Mode cell.

11. An apparatus in accordance with claim 9, wherein the common data transfer protocol is an Asynchronous Transfer Mode protocol and the data packets are Asynchronous Transfer Mode cells.

12. An apparatus in accordance with claim 9, wherein the control data indicates the number of data packets corresponding to the data having a first data transfer format and the number of data packets corresponding to the data having a second data transfer format.

13. In a telecommunication system, an apparatus for transmitting data packets to a receiving station comprises:

means for receiving hybrid data from at least one telecommunication application, wherein the hybrid data comprises a plurality of data transfer formats;

means for inserting data having a first data transfer format into at least one data packet;

means for inserting data having a second data transfer format into at least one data packet;

means for multiplexing the data packets into a single data stream;

means for generating control data for the at least one data packet corresponding to the data having a first data transfer format;

means for generating control data for the at least one data packet corresponding to the data having a second data transfer format;

means for multiplexing the control data into the single data stream;

means for transmitting the data packets and the control data over a common telecommunication channel, including means for transmitting the control data to the receiving station over the common telecommunication channel in a payload portion of an Asynchronous Transfer Mode cell;

wherein the asynchronous transfer mode cell is a resource management Asynchronous Transfer Mode cell, wherein all data packets exhibit a common data transfer protocol.

14. In a telecommunication system, an apparatus for transmitting data packets to a receiving station comprises:

means for receiving hybrid data from at least one telecommunication application, wherein the hybrid data comprises a plurality of data transfer formats;

means for inserting data having a first data transfer format into at least one data packet;

means for inserting data having a second data transfer format into at least one data packet;

means for multiplexing the data packets into a single data stream;

means for generating control data for the at least one data packet corresponding to the data having a first data transfer format;

means for generating control data for the at least one data packet corresponding to the data having a second data transfer format;

means for multiplexing the control data into the single data stream;

means for transmitting the data packets and the control data over a common telecommunication channel, including means for transmitting the control data to the receiving station over the common telecommunication channel in a payload portion of an Asynchronous Transfer Mode cell;

wherein the Asynchronous Transfer Mode cell contains at least one microcell and wherein said control data is inserted into an extended portion of a microcell start pointer, wherein all data packets exhibit a common data transfer protocol.

15. In a telecommunication system, an apparatus for transmitting data packets to a receiving station comprises:

means for receiving hybrid data from at least one telecommunication application, wherein the hybrid data comprises a plurality of data transfer formats;

means for inserting data having a first data transfer format into at least one data packet;

means for inserting data having a second data transfer format into at least one data packet;

means for multiplexing the data packets into a single data stream;

means for generating control data for the at least one data packet corresponding to the data having a first data transfer format;

means for generating control data for the at least one data packet corresponding to the data having a second data transfer format;

means for multiplexing the control data into the single data stream;

means for transmitting the data packets and the control data over a common telecommunication channel, including means for transmitting the control data to the receiving station over the common telecommunication channel in a payload portion of a microcell, wherein all data packets exhibit a common data transfer protocol.

16. An apparatus in accordance with claim 15, wherein the microcell is a resource management microcell.

* * * * *